US009515446B2

(12) United States Patent
Tanino et al.

(10) Patent No.: US 9,515,446 B2
(45) Date of Patent: Dec. 6, 2016

(54) GAS LASER DEVICE

(71) Applicant: Mitsubishi Electric Corporation, Chiyoda-ku (JP)

(72) Inventors: Yoichi Tanino; Junichi Nishimae, Chiyoda-ku (JP); Tatsuya Yamamoto, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 14/898,341

(22) PCT Filed: Dec. 27, 2013

(86) PCT No.: PCT/JP2013/085063
§ 371 (c)(1),
(2) Date: Dec. 14, 2015

(87) PCT Pub. No.: WO2015/008405
PCT Pub. Date: Jan. 22, 2015

(65) Prior Publication Data
US 2016/0134075 A1 May 12, 2016

(30) Foreign Application Priority Data

Jul. 18, 2013 (JP) ................................ 2013-149539

(51) Int. Cl.
*H01S 3/03* (2006.01)
*H01S 3/038* (2006.01)
(Continued)

(52) U.S. Cl.
CPC ............... *H01S 3/038* (2013.01); *H01S 3/034* (2013.01); *H01S 3/0805* (2013.01);
(Continued)

(58) Field of Classification Search
CPC ............ H01S 3/03; H01S 3/034; H01S 3/038; H01S 3/10007
See application file for complete search history.

(56) References Cited

U.S. PATENT DOCUMENTS

2010/0078580 A1 4/2010 Endo et al.
2010/0195196 A1 8/2010 Nowak et al.
(Continued)

FOREIGN PATENT DOCUMENTS

JP 03-261191 A 11/1991
JP 05-218530 A 8/1993
(Continued)

OTHER PUBLICATIONS

International Search Report Issued Feb. 25, 2014, for PCT/JP2013/085063 Filed Dec. 27, 2013.
(Continued)

*Primary Examiner* — Armando Rodriguez
(74) *Attorney, Agent, or Firm* — Oblon, McClelland, Maier & Neustadt, L.L.P.

(57) ABSTRACT

A gas laser device which can perform optical amplification, laser light passing through a laser gas excited by electrical discharge, including: a first and second pair of discharge electrodes arranged longitudinally along an optical axis of the laser light; at least two mirrors reflecting the laser light amplified by the gas laser, the mirrors arranged opposite to each other to interpose a first discharge region defined by the first pair of discharge electrodes and a second discharge region defined by the second pair of discharge electrodes therebetween; and a shielding member located between the first pair of discharge electrodes and the second pair of discharge electrodes, the shielding member protruding from electrode surfaces of the discharge electrodes toward the optical axis of the laser light. The configuration can efficiently suppress parasitic oscillation with a simple structure.

5 Claims, 7 Drawing Sheets

(51) Int. Cl.
  *H01S 3/034* (2006.01)
  *H01S 3/08* (2006.01)
  *H01S 3/10* (2006.01)
  *H01S 3/0971* (2006.01)
  *H01S 3/223* (2006.01)

(52) U.S. Cl.
  CPC ........ *H01S 3/10007* (2013.01); *H01S 3/0971* (2013.01); *H01S 3/2232* (2013.01); *H01S 2301/02* (2013.01)

(56) References Cited

U.S. PATENT DOCUMENTS

| | | |
|---|---|---|
| 2013/0235894 A1 | 9/2013 | Yamamoto et al. |
| 2014/0112362 A1 | 4/2014 | Tanino et al. |
| 2014/0334514 A1 | 11/2014 | Tanino et al. |

FOREIGN PATENT DOCUMENTS

| | | |
|---|---|---|
| JP | 06-061550 A | 3/1994 |
| JP | 06-164029 A | 6/1994 |
| JP | 08-274397 A | 10/1996 |
| JP | 2000-091670 A | 3/2000 |
| JP | 2008-164673 A | 7/2008 |
| JP | 2009-094161 A | 4/2009 |
| JP | 2010-103104 A | 5/2010 |
| JP | 2010-186990 A | 8/2010 |
| JP | 2011-159932 A | 8/2011 |
| WO | 2012/035953 A1 | 3/2012 |
| WO | 2012/176253 A1 | 12/2012 |
| WO | 2013-084608 A | 6/2013 |

OTHER PUBLICATIONS

International Preliminary Report of Patentability mailed Jan. 28, 2016 for PCT/JP2013/085063 filed Dec. 27, 2013.

$$a < \frac{4\lambda z}{\pi\phi \sin(D/z)}$$

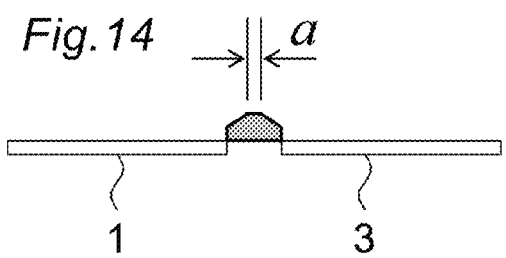
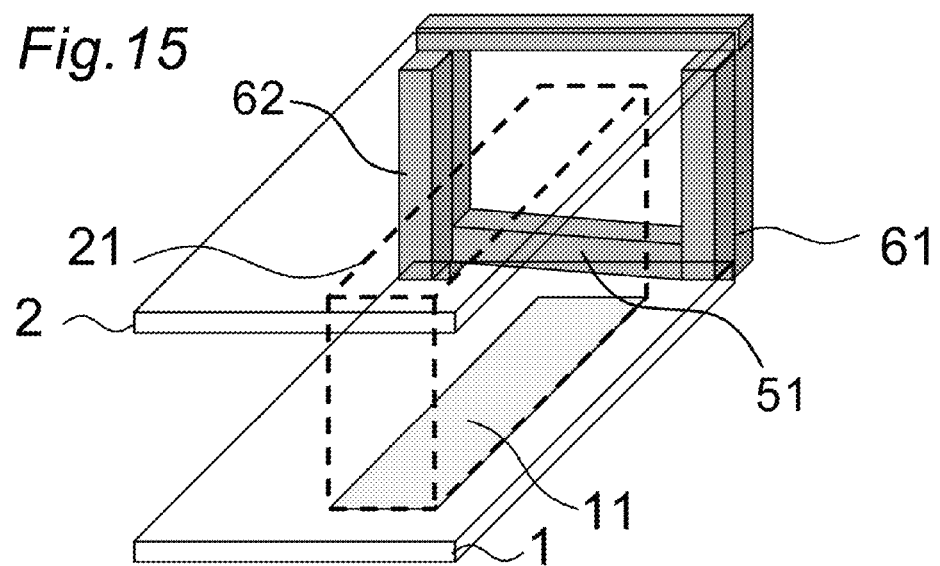

GAS LASER DEVICE

TECHNICAL FIELD

The present invention relates to a gas laser device for amplifying laser light using a laser gas.

BACKGROUND

In conventional gas laser devices (e.g., Patent documents 1 and 2), a saturable absorber (SA) is located between a pre-amplifier and a main amplifier to block out laser light having an optical intensity below a predetermined threshold, thereby absorbing returning light, parasitically oscillating light and self-oscillating light.

PRIOR ART DOCUMENT

Patent Document

[Patent Document 1] JP 2010-103104 A (FIGS. 1 and 2)
[Patent Document 2] JP 2010-186990 A ([0051], FIG. 11)
[Patent Document 3] JP 2011-159932 A
[Patent Document 4] WO 2012/176253 A
[Patent Document 5] WO 2013/084608 A

SUMMARY OF THE INVENTION

Problem to be Solved by the Invention

Such a configuration employing the saturable absorber has a large and complicated, thus naturally expensive mechanism.

It is an object of the present invention to provide a gas laser device which can efficiently suppress parasitic oscillation with a simple structure.

Means for Solving the Problem

In order to achieve the above-mentioned object, the present invention provides a gas laser device which can perform optical amplification wherein laser light passes through a laser gas excited by electrical discharge, including:

a first pair of discharge electrodes and a second pair of discharge electrodes arranged longitudinally along an optical axis of the laser light;

at least two mirrors for reflecting the laser light amplified by the gas laser, the mirrors being each arranged opposite to each other so as to interpose a first discharge region defined by said first pair of discharge electrodes and a second discharge region defined by said second pair of discharge electrodes therebetween; and a shielding member located between said first pair of discharge electrodes and said second pair of discharge electrodes, the shielding member protruding from an electrode surface of the discharge electrodes toward the optical axis of the laser light.

It is preferable in the present invention that a height of protrusion of said shielding member is set to be a height without interference with the laser light.

It is preferable in the present invention that the gas laser device further includes an electrode supporting structure for supporting the first and second pairs of discharge electrodes, wherein said shielding member is formed integral with said electrode supporting structure.

It is preferable in the present invention that a shape of protrusion of said shielding member has a shape selected from the group of saw-tooth wave, triangle wave and sinusoidal wave.

It is preferable in the present invention that a plurality of said shielding members are located so as to interpose the optical axis of the laser light therebetween.

It is preferable in the present invention that said shielding member is formed of aluminum having an alumited surface.

It is preferable in the present invention that the surface of said shielding member has a surface roughness rougher than a wavelength of the laser light.

It is preferable in the present invention that apertures each having an opening through which the laser light passes are located in front of said mirrors.

It is preferable in the present invention that the laser gas is supplied in a direction perpendicular to both of the optical axis of the laser light and the discharge direction, and the supply direction of the laser gas to said first pair of discharge electrodes is opposite to the supply direction of the laser gas to said second pair of discharge electrodes.

It is preferable in the present invention that said shielding member has sloping surfaces each facing the first and second discharge regions, the sloping surfaces being tilted with respect to the optical axis of the laser light.

It is preferable in the present invention that for said shielding member the following equation is satisfied, wherein a is a width of a surface oriented in a direction of protrusion height as measured along the optical axis, $\lambda$ is a wavelength of the laser light, $\phi$ is a diameter of said opening, D is a discharge gap between the discharge electrodes, and z is a distance from said shielding member to said opening.

[Eq. 1]

$$a < \frac{4\lambda z}{\pi \phi \sin(D/z)}$$

Effect of the Invention

According to the present invention, the shielding member protruding from the electrode surface of the discharge electrodes toward the optical axis of the laser light is located between the first pair of discharge electrodes and the second pair of discharge electrodes, thereby efficiently suppressing parasitic oscillation which travels off the optical axis of the laser light with a simple structure.

BRIEF DESCRIPTION OF THE DRAWINGS

FIG. 14 is an explanatory view showing an example of cross-sectional shape of the shielding plate.

FIG. 15 is a partial perspective view showing another example of the shielding plate.

EMBODIMENT FOR CARRYING OUT THE INVENTION (Embodiment 1)

Figure 1:
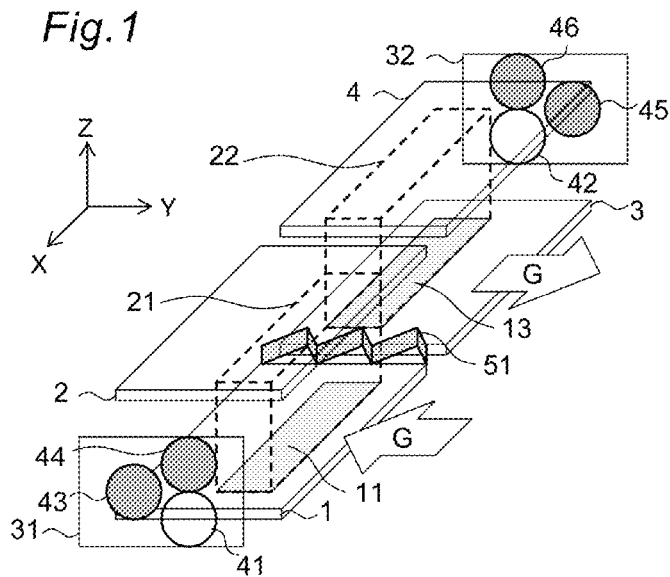
FIG. 1 is a perspective view of a gas laser device according to Embodiment 1 of the present invention.

FIG. 1 is a perspective view of a gas laser device according to Embodiment 1 of the present invention. FIG. 2 is a cross-sectional view showing an electrode supporting structure. FIG. 3 is a partial perspective view showing a structure in which the electrode supporting structure and the shielding plate are formed integral with each other.

The gas laser device constitutes a so-called triaxial orthogonal gas laser device, including electrode substrates 1, 2, 3 and 4, electrodes 11, 12, 13 and 14, mirror supports 31 and 32, windows 41 and 42, mirrors 43, 44, 45 and 46, and a shielding plate 51. Hereinafter, for easy understanding, a direction substantially parallel to an optical axis of laser light is referred to as X direction, and a direction parallel to a supply direction of a laser gas is referred to as Y direction, and a direction parallel to a discharge direction is referred to as Z direction.

The electrode substrates 1, 2, 3 and 4 are formed of dielectric material, such as alumina, onto the surfaces of which metallic electrodes 11, 12, 13 and 14 are adhered using, e.g., metallization or paste. Such a structure in which the electrode is supported on the electrode substrate is employed to enhance mechanical strength of the whole discharge mechanism.

Figure 2A:
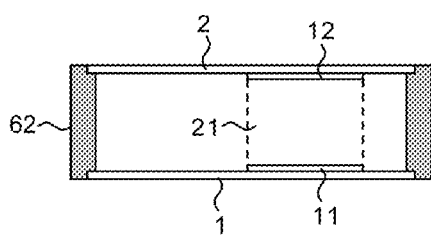
FIGS. 2A and 2B are cross-sectional views showing electrode supporting structures.
Figure 3:
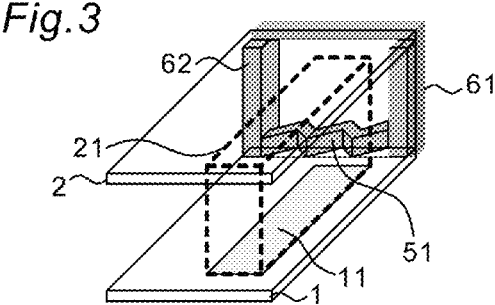
FIG. 3 is a partial perspective view showing a structure in which the electrode supporting structure and the shielding plate are formed integral with each other.

As shown in FIG. 2A, a pair of the electrode substrates 1 and 2 are supported by electrode supporting structures 61 and 62 and located opposite to each other. On inner faces of the electrode substrates 1 and 2 a pair of the electrodes 11 and 12 are located at a position displaced to Y direction with respect to the center. When an alternating voltage from a high-frequency power supply (not shown) is applied to the electrodes 11 and 12, silent electric discharge (ozonizer discharge) takes place to create a discharge region 21. This discharge region 21, as shown in FIG. 1, is supplied with a laser gas G toward −Y direction.

Figure 2B:
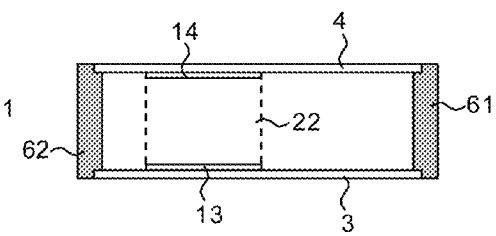

Further, as shown in FIG. 2B, a pair of the electrode substrates 3 and 4 are supported by the electrode supporting structures 61 and 62 and located opposite to each other. On inner faces of the electrode substrates 3 and 4 a pair of the electrodes 13 and 14 are located at a position displaced to −Y direction with respect to the center. When an alternating voltage from a high-frequency power supply (not shown) is applied to the electrodes 13 and 14, silent electric discharge (ozonizer discharge) takes place to create a discharge region 22. This discharge region 22, as shown in FIG. 1, is supplied with a laser gas G toward Y direction.

The pair of electrode substrates 1 and 2 and the pair of electrode substrates 3 and 4 are each arranged longitudinally along the optical axis of the laser light. The discharge electrodes 11, 12, 13 and 14 have, for example, metal portions with a surface area of about 5 cm×100 cm. Each of the discharge regions 21 and 22 has, for example, a cuboid shape of about 5 cm×5 cm×100 cm.

When molecules or atoms in the laser gas G are excited to an upper level of laser by silent electric discharge, they can perform optical amplification. In case of using, for example, a mixed gas containing $CO_2$ molecules as the laser gas G, optical amplification with a wavelength of 10.6 μm can be performed due to transition between oscillatory levels of the $CO_2$ molecule. Optical amplification with another wavelength, such as 9.3 μm, 9.6 μm, 10.2 μm, can be also performed depending on design of transmissive films of the windows 41 and 42 and reflective films of the mirrors 43, 44, 45 and 46.

Here, a case of using $CO_2$ as the laser gas G is exemplified, but the present invention can be also applied to other cases of using another laser medium, e.g., CO, $N_2$, He—Cd, HF, $Ar^+$, ArF, KrF, XeCl, XeF, etc.

The gas laser device includes a housing (not shown) for separating the laser gas G from an external air. Inside the housing heat exchangers, blowers, ducts, etc. are located. The blower can circulate the laser gas G enclosed in the housing along an air channel inside the duct, so that the laser gas G is supplied along the arrow direction toward the discharge regions 21 and 22, respectively. The laser gas G passing through the discharge regions 21 and 22 is cooled down by the heat exchangers, and then returned to the blowers. In the discharge regions 21 and 22 the laser gas G is kept at a pressure below the atmospheric pressure. The laser gas G moves in the arrow direction shown in FIG. 1 with a spatially uniform velocity distribution at a speed of, e.g., 100 m/s.

In this case the supply direction of the laser gas to the discharge region 21 is opposite to the supply direction of the laser gas to the discharge region 22, so that the total gain distribution obtained by superposing gain distributions of the discharge regions 21 and 22 is made symmetric, thereby improving symmetric property of an output laser beam.

The windows 41 and 42 and the mirrors 43, 44, 45 and 46 are located opposite to each other so as to interpose the discharge regions 21 and 22 therebetween. The window 41 and the mirrors 43 and 44 are attached via the mirror support 31 to the housing. The window 42 and the mirrors 45 and 46 are attached via the mirror support 32 to the housing. For the windows 41 and 42, for example, a diamond substrate having an anti-reflection coating can used. The windows 41 and 42 have a function to allow transmission of the laser light between the inside and the outside of the gas laser device and to separate the laser gas G from the external air. For the mirrors 43, 44, 45 and 46, for example, a total reflection mirror having a concave, flat or convex face can be used to constitute a path of optical amplification.

Figure 4:
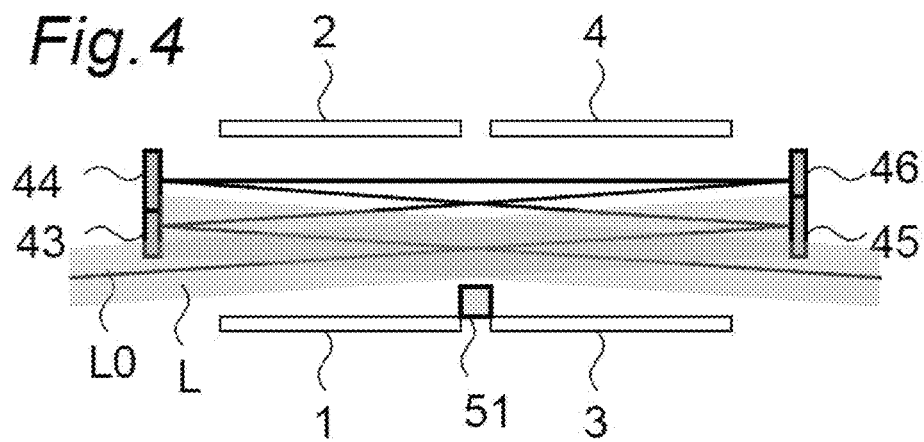
FIG. 4 is an explanatory view showing a path of laser light in the gas laser device.

FIG. 4 is an explanatory view showing a path of laser light in the gas laser device. The gas laser device has a function to amplify pulse laser light. The laser light L enters through the window 41 along the optical axis L0, and then is reflected sequentially by the mirror 45, the mirror 44, the mirror 46 and the mirror 43, and then exits through the window 42.

In this path arrangement, the mirror 44 is non-parallel to the mirrors 45 and 46, and the mirror 43 is non-parallel to the mirrors 45 and 46. This non-parallel arrangement can suppress parasitic oscillation between the opposite mirrors (See Patent Document 3).

Figure 5:
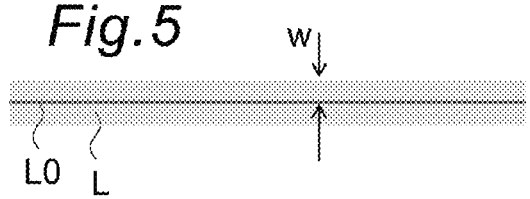
FIG. 5 is an explanatory view showing relationship between laser light and the optical axis thereof.

FIG. 5 is an explanatory view showing relationship between laser light L and the optical axis L0 thereof. The laser light L propagates with a breadth of a beam radius w with respect to the optical axis L0. The beam radius w can be defined in various ways, by way of example, as a radius of a circle containing 86% out of the energy propagated by the laser light. In FIG. 4 the optical axis L0 is illustrated over the whole path, but the laser light L is illustrated over a portion of the path to avoid graphical complication, so that illustration of the laser light L is omitted in the interval between mirrors 45 and 44, the interval between mirrors 44 and 46, and the interval between mirrors 46 and 43.

Returning to FIG. 1, the shielding plate 51 is located between the pair of electrode substrates 1 and 2 and the pair of electrode substrates 3 and 4, with such a shape as protruding from electrode surfaces of the discharge electrodes toward the optical axis of the laser light. The shielding plate 51 is preferably formed of aluminum material having an alumited surface. Further, the surface of the shielding plate 51 preferably has a surface roughness rougher than a wavelength of $CO_2$ laser (In other words, arithmetic average roughness Ra>10.6 μm). The surface roughness of the shielding plate 51 may be, e.g., in a range of 20 to 40 μm, which can be manufactured using sandblasting process, knurling process, other cutting processes, rolling process, chemical process or the like.

The shielding plate 51 may have another macroscopic three-dimensional shape other than the above-mentioned surface roughness, for example, a cyclic wavy shape composed of three mountains arranged in a pitch of 4 cm between mountains. The peaks thereof is positioned higher than the electrode surfaces of the electrodes 11 and 13.

As shown in FIG. 3, the shielding plate 51 can be formed integral with the electrode supporting structures 61 and 62. In this case the electrode supporting structures 61 and 62 are also preferably formed of aluminum material having an alumited surface. This integrated structure can reduce the number of parts and cost of manufacturing.

The height of the shielding plate 51 is set to be a height without interference with the laser light L. In this embodiment the height $H_{51}$ of the shielding plate 51 can be set using the beam radius w, for example, according to the following formula (1), wherein $H_{L0}$ is a height of the optical axis of the laser light as measured from the electrode substrates 1 and 3 at the position of the shielding plate 51.

$$H_{51}=H_{L0}-1.5w \quad (1)$$

Thus, the shielding plate 51 is located between volumes of the laser gas each excited by two pairs of electrodes so as to form a protrusion with respect to the electrode surfaces, thereby efficiently suppressing parasitic oscillation with an inexpensive structure, as described below.

Parasitic oscillation interferes with aimed amplification of pulse laser to reduce efficiency of amplification, and laser light may oscillate in an unintended direction, resulting in malfunction of equipments located inside and outside the gas laser device. In conventional gas laser devices, as disclosed in Patent Document 2, a saturable absorber is located between two discharge tubes, thereby suppressing parasitic oscillation. The saturable absorber includes a system in which a mixed gas which can absorb laser light is circulated and cooled in a cell through which the laser light passes. The system is very complicated and more expensive than such a member as the shielding plate according to this embodiment. Further, the saturable absorber absorbs a part of pulse laser light, so that the pulse laser light passes through the saturable absorber with reduced efficiency of amplification.

Figure 6:
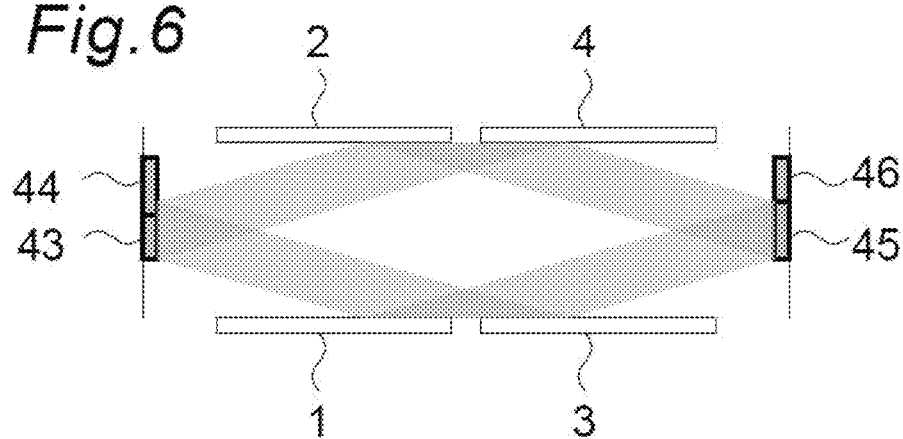
FIG. 6 is an explanatory view showing an example of parasitic oscillation.

In contrast, this embodiment constitutes the gas laser device which can suppress parasitic oscillation without using any saturable absorbers. In case of the shielding plate 51 being absent in FIG. 1, even when employing a technique to position the opposite mirrors (e.g., mirrors and 46, and mirrors 43 and 45) so as not to face in parallel to each other in order to suppress parasitic oscillation between the opposite mirrors, it turns out that an electrode reflection mode of parasitic oscillation can take place as shown in FIG. 6. Here, it is called "electrode reflection mode of parasitic oscillation", because reflection by electrode is present on the path of parasitic oscillation.

This electrode reflection mode of parasitic oscillation can take place not only among mirrors 43 to 46, but also in other paths including reflection by mirrors 43 to 46 and structural members for supporting the windows 41 and 42. Further, it turns out that even when the discharge electrode is divided into two pairs of electrodes 11 and 12 and electrodes 13 and 14 with a gap between the two pairs of electrodes, parasitic oscillation can also take place.

Figure 7:
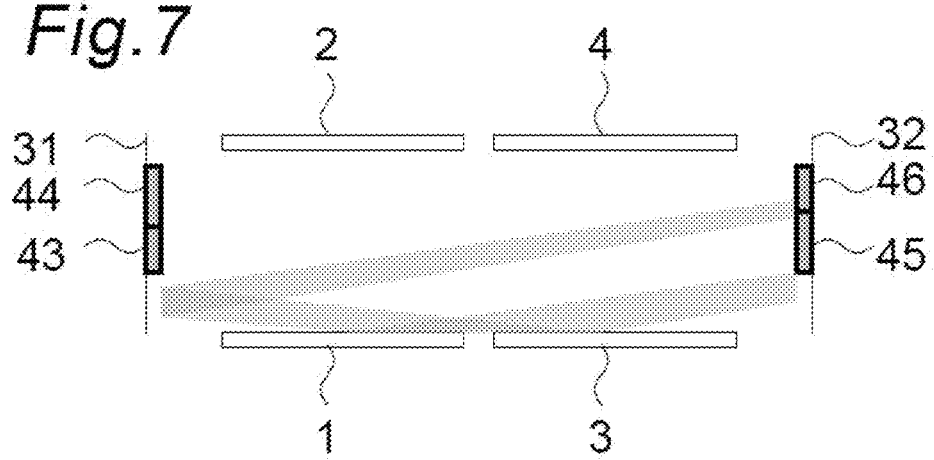
FIG. 7 is an explanatory view showing another example of parasitic oscillation.

In an optical path of amplification in which laser light is multi-folded (In this embodiment five-folded optical path), there is a complicated mechanism, such as holder, for attaching the window 41 and the mirrors 43 and 44 to the mirror support 1. Further, a gain per one way of amplifier is increased in proportion to the folding number. Therefore, as the folding number is further increased, there is an increased possibility that parasitic oscillation takes place in an unintended path. As shown in FIG. 7, the mirror supports 31 and 32 or some mechanisms for attaching windows or mirrors may cause parasitic oscillation due to slight reflection of light.

In fact, in an arrangement of the shielding plate being absent in FIG. 1, we confirm that an electrode reflection mode of parasitic oscillation in which electrode reflection is present on the path of parasitic oscillation can take place. Thus, in this embodiment the shielding plate 51 is located between the discharge regions 21 and 22 so as to form a protrusion with respect to the electrode surfaces, thereby suppressing an electrode reflection mode of parasitic oscillation. Incidentally, the shielding plate 51 may not be necessarily made to absorb laser light but made to scatter laser light. The former manner to absorb laser light is surer to suppress parasitic oscillation. In the present invention a member which can absorb or scatter laser light is called shielding plate.

In the present invention the shielding plate 51 is located between volumes of the laser gas each excited by two pairs of electrodes (two pairs of electrodes 11 and 12 and electrodes 13 and 14) so as to form a protrusion with respect to the electrode surfaces, thereby suppressing parasitic oscillation with an inexpensive structure. In particular, suppression of the above-mentioned electrode reflection mode of parasitic oscillation results in greater parasitic oscillation suppression effect.

The greater parasitic oscillation suppression effect can prevent the gain from being reduced due to the parasitic oscillation, so that pulse amplification can be achieved with a higher efficiency. Further, the gas laser device can be protected from burnout caused by the parasitic oscillation.

If the shielding plate 51 is too high and interferes with the laser light L to be amplified, the amplification output is reduced with degraded beam quality of the laser light to be amplified. The higher shielding plate 51 without interference with the laser light L to be amplified results in greater parasitic oscillation suppression effect.

In laser devices for amplifying laser light by means of multi-folded arrangement (In this embodiment five-folded arrangement), the laser light passes through the discharge region many times to achieve amplification with a higher gain while parasitic oscillation more easily takes place. In this embodiment the multi-folded laser light passes through regions (close to the electrodes 11 and 13) which are lower than the height of the shielding plate 51. Thus, discharge excitation energy stored in the discharge region can be effectively utilized to produce as high a laser light amplification output as possible.

The shielding plate 51 is formed of aluminum material having an alumited surface to suppress parasitic oscillation using an inexpensive and easily available material. Further, the aluminum material having an alumited surface is hard to be invaded by the laser gas, resulting in a loner lifetime of the gas laser device. Incidentally, the shielding plate 51 may be formed of not only aluminum material, but also other metals or metal oxides.

Further, the surface of the shielding plate 51 is surface-processed to have a surface roughness rougher than a wavelength of the laser light to be amplified, thereby more effectively suppressing the electrode reflection mode of parasitic oscillation.

Such integration of the electrode supporting structure 61 and the shielding plate 51 can enhance heat dissipation from the shielding plate 51 when the shielding plate is heated up by absorbing an outer edge of the pulse laser to be amplified, and can provide the gas laser device which can be easily assembled at low cost.

Incidentally, in case of the surface of the shielding plate 51 being oriented at an angle substantially perpendicular to the direction of the optical axis, parasitic oscillation easily takes place. Therefore, the surface of the shielding plate 51 is preferably oriented at an angle (e.g., 20 degree) which is not definitely perpendicular to the direction of the optical axis. The angle is designed to prevent the possibility that a laser beam propagates from the mirrors 41, 43 and 44 or the mirror support 31 to the shielding plate 51 and then specularly reflected from the shielding plate 51 to return back to the mirrors 41, 43 and 44 or the mirror support 31, thereby efficiently suppressing parasitic oscillation. The surface of the shielding plate 51 has a wavy shape (In this embodiment a wavy shape composed of three mountains), thereby most efficiently suppressing parasitic oscillation with a reduced volume of the shielding plate 51. Incidentally, the shielding plate is not limited to the wavy shape composed of three mountains, but also may have one mountain, two mountains, or more than three mountains. The corner of the mountain may be round or sharp.

Figure 8A:
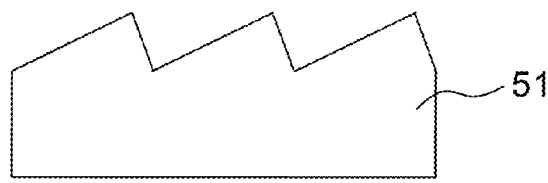
FIGS. 8A to 8C are explanatory views showing various examples of wavy shapes of the shielding plate.
Figure 8B:
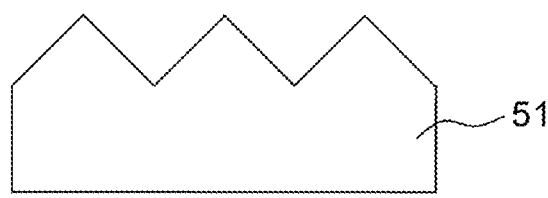
Figure 8C:
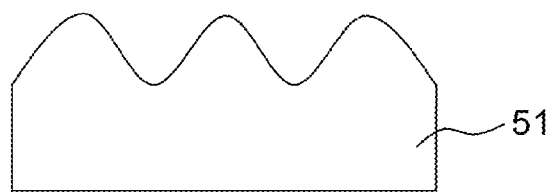

FIGS. 8A to 8C are explanatory views showing various examples of wavy shapes of the shielding plate 51. FIG. 8A shows a shape of saw-tooth waves as shown in FIG. 1. FIG. 8B shows a shape of triangle waves. FIG. 8C shows a shape of sinusoidal waves. The wavy shape of the shielding plate 51 can be selected from these shapes, or have one mountain, two mountains, or more than three mountains.

The laser gas G is supplied in a direction perpendicular to both of the optical axis of the laser light and the discharge direction, and the supply direction of the laser gas to the discharge region 21 is opposite to the supply direction of the laser gas to the discharge region 22. The above-mentioned supply direction of the laser gas is employed in the integrated structure of the electrode supporting structure 61 and the shielding plate 51, so that the flow of the laser gas is not blocked by the shielding plate. Consequently, loss of energy can be minimized while a desired flow speed of the laser gas can be achieved. Since the flow of the laser gas is perpendicular to the optical axis of the laser light, distribution of temperature of the laser gas is created in the direction of the flow of the laser gas to take on a characteristic of bending the path of the laser light. Similarly, a parasitically oscillated laser beam is also bent. In this embodiment the supply direction of the laser gas to the discharge region 21 is set opposite to the supply direction of the laser gas to the discharge region 22, so that the paths of the parasitically oscillated laser beams can be cancelled in terms of bentness each other, thereby suppressing parasitic oscillation out of design intent.

FIG. 15 is a partial perspective view showing another example of the shielding plate 51. In FIG. 15 the shielding plate 51 has such a shape as protruding from the electrode surfaces of the discharge electrodes toward the optical axis of the laser light, and the top surface thereof facing the optical axis is made flat, not of wave or mountain shape. In addition, the shielding plate 51 has sloping surfaces each facing the discharge regions 21 and 22 and tilted with respect to the optical axis of the laser light. In this structure angle arrangement can be designed to prevent the possibility that a laser beam propagates from the mirror support 31 having the mirrors 41, 43 and 44 to the shielding plate 51 and then specularly reflected from the shielding plate 51 to return back to the mirror support 31 having the mirrors 41, 43 and 44, thereby efficiently suppressing parasitic oscillation.

(Embodiment 2)

Figure 9:
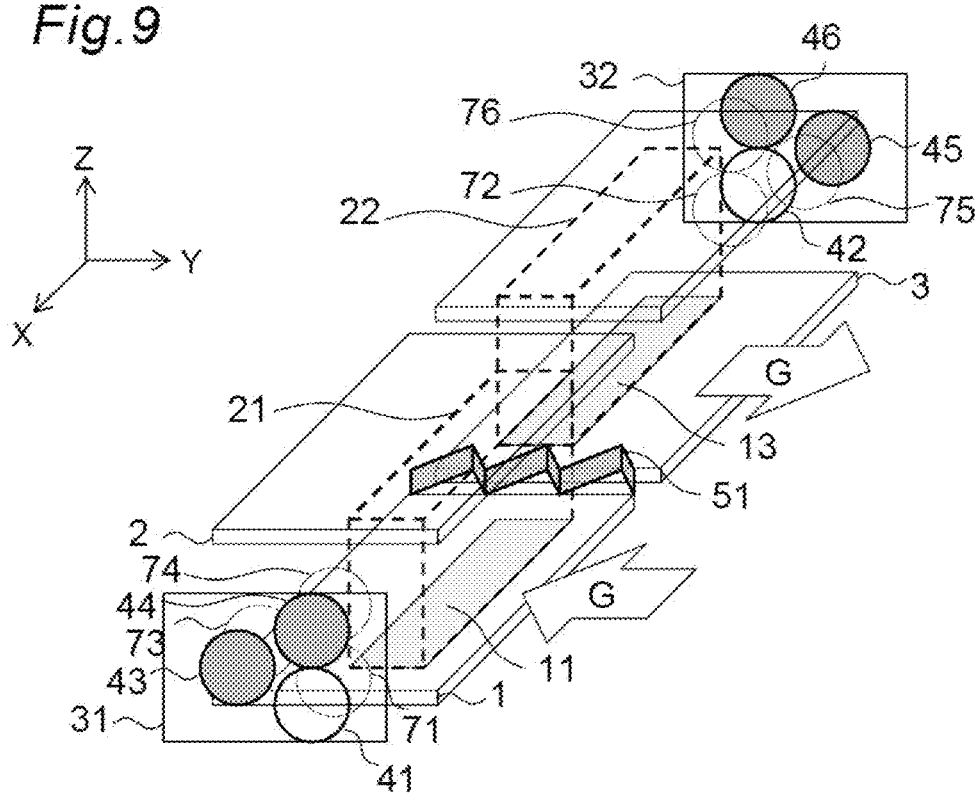
FIG. 9 is a perspective view of a gas laser device according to Embodiment 2 of the present invention.

FIG. 9 is a perspective view of a gas laser device according to Embodiment 2 of the present invention. This gas laser device has a configuration similar to those as described in Embodiment 1, except that apertures 71, 72, 73, 74, 75 and 76 are installed.

The apertures 71 and 72 are located inside the windows 41 and 42, respectively. The apertures 73, 74, 75 and 76 are located inside the windows 43, 44, 45 and 46, respectively. The apertures 71 to 76 are members made of cupper, each having a circular opening. Laser light can pass through inside the opening and cannot pass through outside the opening. These apertures 71 to 76 are attached to the mirror supports 31 and 32 or the housing of the device, respectively.

Figure 10:
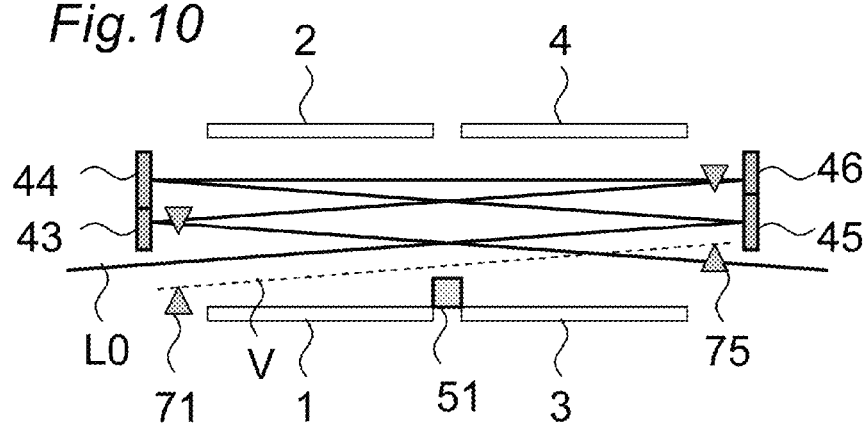
FIG. 10 is an explanatory view illustrating a method of determining a height of the shielding plate.

FIG. 10 is an explanatory view illustrating a method of determining a height of the shielding plate. To avoid graphical complication, only two apertures 71 and 75 out of six apertures are illustrated, but similar method can be applied to the other apertures 72 to 74 and 76. Further, a virtual line V connecting lower edges of the apertures 71 and 75 with each other is secondarily illustrated, which is an indicator of a lower limit of the laser light propagating from the aperture 71 to the aperture 75.

In this embodiment the height $H_{51}$ of the shielding plate 51 can be set, for example, according to the following formula (2), wherein $H_V$ is a height of the line V as measured from the electrode substrates 1 and 3 at the position of the shielding plate 51. $\delta$ is a margin for assembly error, in this embodiment $\delta = 1$ mm.

$$H_{51} = H_V - \delta \qquad (2)$$

According to this configuration, the aperture can define a range in which the laser light can exist, so that the height of the shielding plate without interference with the laser light L to be amplified can be determined. Consequently, degrading beam quality of the laser light can be minimized while parasitic oscillation can be effectively suppressed.

(Embodiment 3)

Figure 11:
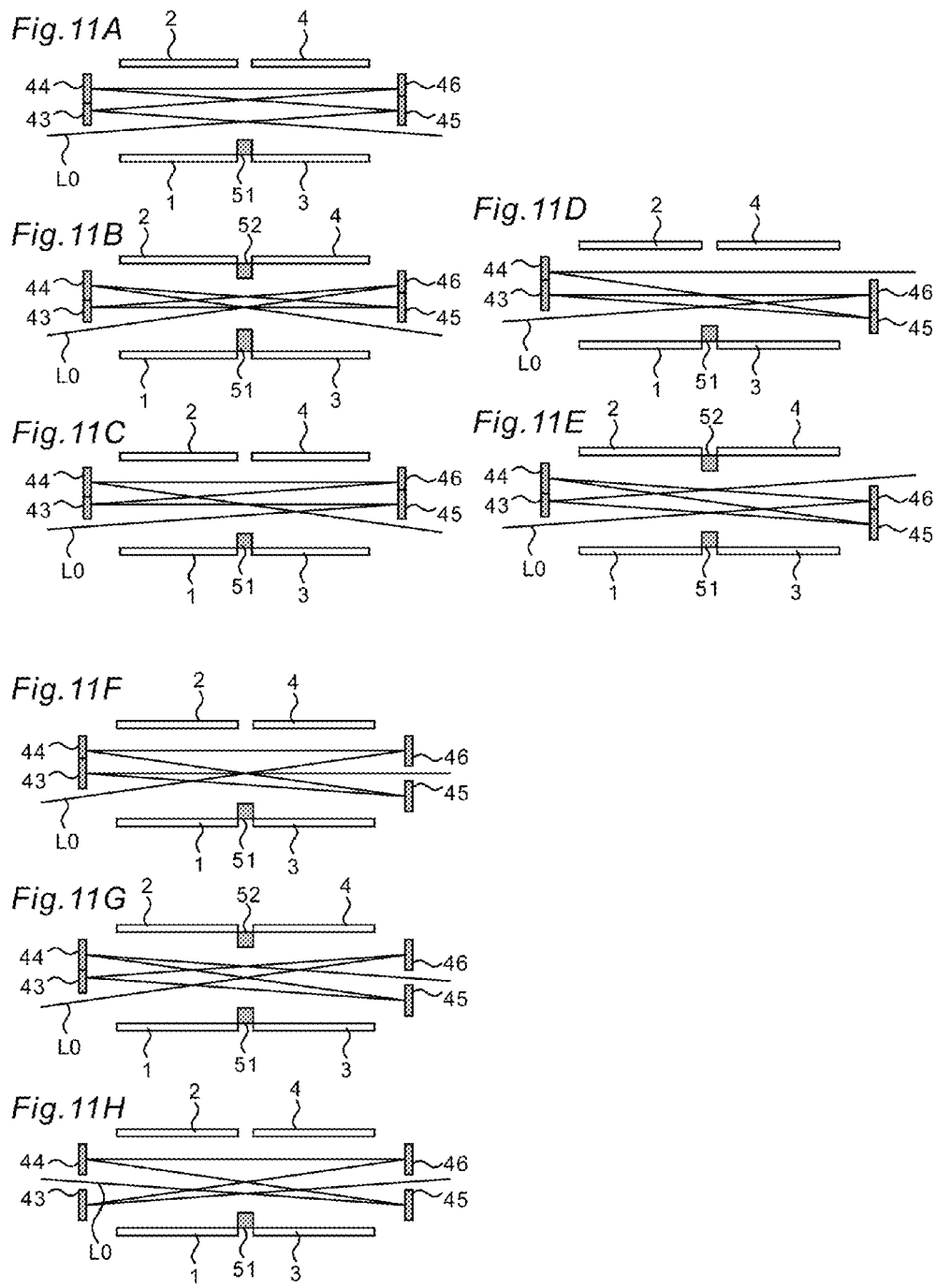
FIGS. 11A to 11H are structural views showing Embodiment 3 of the present invention.

FIGS. 11A to 11H are structural views showing Embodiment 3 of the present invention, wherein various settings of the optical axis of the laser light are shown. FIG. 11A shows the optical path according to Embodiment 1, equivalent to those as shown in FIG. 4. Pulse laser light (optical path L0) enters through the window 41 shown in FIG. 1, and then is reflected sequentially by the mirror 45, the mirror 44, the mirror 46 and the mirror 43, and then exits through the window 42 shown in FIG. 1.

In FIG. 11B pulse laser light travels in a sequence of the window 41, the mirror 46, the mirror 43, the mirror 45, the mirror 44 and the window 42. An additional shielding plate 52 is installed opposite to the shielding plate 51.

In FIG. 11C pulse laser light travels in a sequence of the window 41, the mirror 45, the mirror 43, the mirror 46, the mirror 44 and the window 42.

In FIG. 11D pulse laser light travels in a sequence of the window 41, the mirror 46, the mirror 43, the mirror 45, the mirror 44 and the window 42. The window 42 is located closer to the electrode substrate 4.

In FIG. 11E pulse laser light travels in a sequence of the window 41, the mirror 46, the mirror 44, the mirror 45, the mirror 43 and the window 42. The window 42 is located closer to the electrode substrate 4. An additional shielding plate 52 is installed opposite to the shielding plate 51.

In FIG. 11F pulse laser light travels in a sequence of the window 41, the mirror 46, the mirror 44, the mirror 45, the mirror 43 and the window 42. The window 42 is located between the mirrors 45 and 46.

In FIG. 11G pulse laser light travels in a sequence of the window 41, the mirror 46, the mirror 43, the mirror 45, the mirror 44 and the window 42. The window 42 is located between the mirrors 45 and 46. An additional shielding plate 52 is installed opposite to the shielding plate 51.

In FIG. 11H pulse laser light travels in a sequence of the window 41, the mirror 45, the mirror 44, the mirror 46, the mirror 44 and the window 42. The window 41 is located between the mirrors 43 and 44. The window 42 is located between the mirrors 45 and 46.

The height of the shielding plate 52 can be determined using the above-mentioned formula (1) or (2), likewise for the shielding plate 51. Further, the shielding plate 52 can be also formed integral with the electrode supporting structures 61 and 62, likewise for the shielding plate 51. Thus, providing two shielding plates 51 and 52 on the upside and downside can more effectively suppress the electrode reflection mode of parasitic oscillation.

In FIGS. 11A to 11H, when the height of the shielding plate is determined and located, the total height of the shielding plates 51 and 52 satisfies the following formula (3).

$$(A) \approx (C) \approx (D) \approx (F) \approx (H) < (E) \approx (G) < (B) \quad (3)$$

Therefore, any settings of FIGS. 11A to 11H can suppress parasitic oscillation to an extent equal to or more remarkable than Embodiment 1.

Incidentally, other settings obtained by vertically reversing the settings of FIGS. 11A to 11H can be employed. Further, yet other settings obtained by horizontally reversing the settings of the window 41 and the mirrors 43 and 44 can achieve the same effect. Further, yet other settings obtained by horizontally reversing the settings of the window 42 and the mirrors 45 and 46 can achieve the same effect.

(Embodiment 4)

Figure 12:
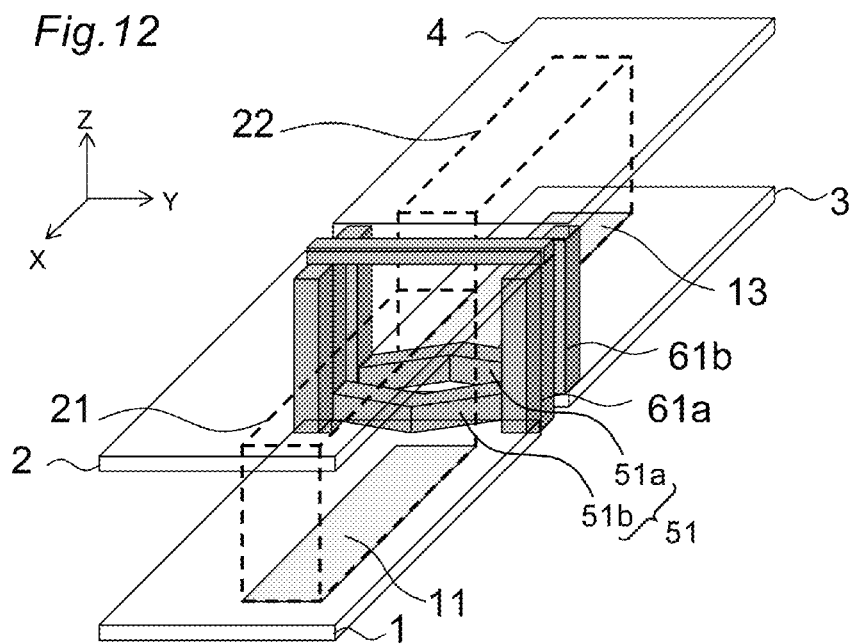
FIG. 12 is a partial perspective view showing Embodiment 4 of the present invention.

FIG. 12 is a partial perspective view showing Embodiment 4 of the present invention. This gas laser device has a configuration similar to those as described in Embodiment 1. Here, the shielding plate is described in more detail. Shielding plates 51a and 51b are formed integral with electrode supporting structures 61a and 61b, respectively.

The shielding plates 51a and 51b have sloping surfaces each facing the discharge regions 21 and 22 and tilted with respect to the optical axis of the laser light, for example, with a shape of triangle wave having one mountain. The shielding plate 51a has a protrusion of triangle wave having one mountain, oriented to the discharge region 22. The shielding plate 51b has a protrusion of triangle wave having one mountain, oriented to the discharge region 21. Thus, since the shielding plates 51a and 51b have protruding shapes from the point of view of the discharge regions 21 and 22, light rays generated in the discharge regions 21 and 22 impinge on the shielding plates 51a and 51b, and then are reflected therefrom toward the outside of the discharge region, thereby minimizing a risk of parasitic oscillation.

Incidentally, the shape of the shielding plate according to this embodiment can be also used in combination with the above-mentioned Embodiments 1 to 3.

Figure 13:
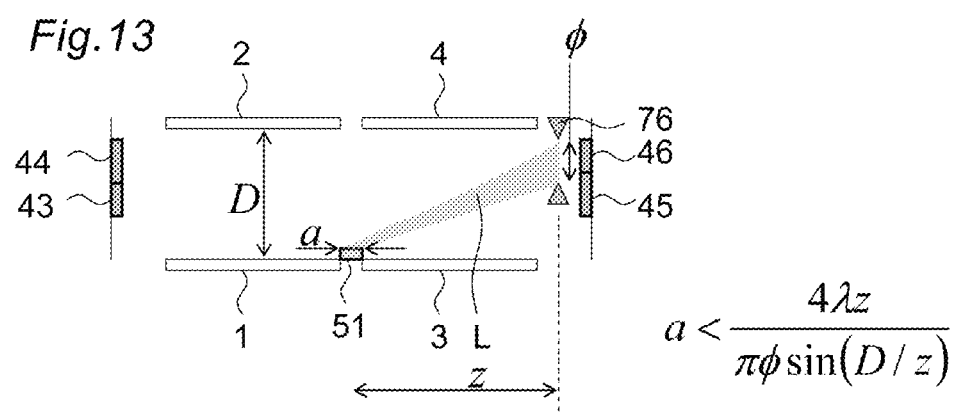
FIG. 13 is an explanatory view showing relationship between a width of top surface of the shielding plate and the path of laser light.

FIG. 13 is an explanatory view showing relationship between a width of a surface (here, called top surface) of the shielding plate 51 oriented in a direction of protrusion height as measured along the optical axis, and the path of the laser light, wherein a is a width of the top surface, $\lambda$ is a wavelength of the laser light, $\phi$ is a diameter of the opening, D is a discharge gap between the discharge electrodes, and z is a distance from the shielding plate to the opening. Generally, the distance z is sufficiently larger than the gap D. In this embodiment, for example, z=1 m and D=5 cm. In order to suppress parasitic oscillation, it is important that no laser beam propagating from the top surface to mirror can exist. In FIG. 13, by way of example, a beam L travelling toward the mirror 46 is illustrated. A laser beam having a smaller beam diameter at the slimmest position exhibits a larger spread angle of beam diameter. Therefore, the smaller the width a is, the larger the beam diameter of the beam reflected by the top surface is on the mirror 46. When the width a is sufficiently small, the beam diameter becomes larger than an aperture diameter of the aperture diameter 76 located in front of the mirror 46, so that the beam is also scattered by the aperture, thereby remarkably reducing a risk of the electrode reflection mode of parasitic oscillation travelling via the top surface of the shielding plate, any mirror or electrode.

Here, a radius $w_0$ of the beam reflected by the top surface of the shielding plate directly toward the mirror can be given by the following formula (4). In this case the largest angle of incident D/z is used in consideration of the worst case showing the largest radius of beam.

[Eq. 2]

$$w_0 = \frac{1}{2} a \sin\left(\frac{D}{z}\right) \quad (4)$$

In case of parallel light being above the top surface of the shielding plate, the beam exhibits the smallest spread after propagating along the distance z sufficiently longer than a. The radius of beam at the aperture can be given by the following formulae (5) and (6).

[Eq. 3]
$$w = w_0\sqrt{1+z^2/z_0^2} \quad (5)$$

$$z_0 = \pi w_0^2/\lambda \quad (6)$$

In case of z being sufficiently larger than a, the formula (5) can be approximated by the following formula (7).

[Eq. 4]
$$w = w_0 z/z_0 \quad (7)$$

By using the formulae (7) and (6), the radius of beam at the aperture can be obtained. When the radius of beam at the aperture is larger than the radius of the aperture, a risk of parasitic oscillation can be remarkably reduces. This condition can be given by the following formula (8).

[Eq. 5]
$$\frac{\lambda z}{\pi w_0} > \frac{1}{2}\phi \quad (8)$$

By substituting the formula (4) in this formula (8), a range of the width a which can be regarded as a sufficiently small value can be given by the following formula (9).

[Eq. 6]
$$a < \frac{4\lambda z}{\pi \phi \sin(D/z)} \quad (9)$$

When the width a of the top surface of the shielding plate 51 is so small to satisfy the formula (9), a risk of the electrode reflection mode of parasitic oscillation travelling via the top surface of the shielding plate, any mirror or electrode can be remarkably reduced.

FIG. 14 is an explanatory view showing an example of cross-sectional shape of the shielding plate. In order to make the width a of the top surface of the shielding plate 51 small, chamfer (corner) processing is performed so that corners of the shielding plate 51 are peeled off to have a flat or round face. This processing can maintain a cross-sectional area of the shielding plate 51 to withstand heat while reducing a risk of parasitic oscillation. A shape having a infinitely approaching zero by steepling the top surface is more preferable.

Further, Embodiments 1 to 4 exemplifies cases of the optical path being five-folded in the housing, but other cases of the optical path being multi-folded, e.g., six or more folded, can also suppress parasitic oscillation.

INDUSTRIAL APPLICABILITY

The present invention is industrially very useful in that parasitic oscillation can be effectively suppressed with a simple structure.

EXPLANATORY NOTE 1 to 4 ELECTRODE SUBSTRATE
11 to 14 ELECTRODE
21, 22 DISCHARGE REGION
31, 32 MIRROR SUPPORT
41, 42 WINDOW
43 to 46 MIRROR
51, 51a, 51b, 52 SHIELDING PLATE
61, 62, 61a, 61b ELECTRODE SUPPORTING STRUCTURE
71 to 76 APERTURE
G LASER GAS
L LASER LIGHT
L0 OPTICAL AXIS
V VIRTUAL LINE
w RADIUS OF BEAM

The invention claimed is:

1. A gas laser device for performing optical amplification wherein laser light passes through a laser gas excited by electrical discharge, and a discharge direction, an optical axis of said laser light, and a direction of flow of said laser gas are orthogonal to one another, comprising:
a first pair of discharge electrodes and a second pair of discharge electrodes arranged longitudinally along the optical axis of said laser light;
at least four mirrors for reflecting the laser light amplified by said gas laser, the mirrors being each arranged opposite to each other so as to interpose a first discharge region defined by said first pair of discharge electrodes and a second discharge region defined by said second pair of discharge electrodes therebetween;
at least two windows for separating said laser gas from an external air; and
a shielding member located between discharge electrodes positioned on the same side with respect to the optical axis of said laser light, out of said first and second pairs of discharge electrodes, the shielding member protruding from an electrode surface of said discharge electrodes toward the optical axis of said laser light,
wherein said at least two windows are arranged on the side of the discharge electrodes on which said shielding member is located, with respect to said at least four mirrors, and
the optical axis of said laser light passing through said at least two windows inclines with respect to the electrode surfaces of said first and second pairs of discharge electrodes.

2. The gas laser device according to claim 1, wherein a shape of protrusion of said shielding member has a shape selected from the group of saw-tooth wave, triangle wave and sinusoidal wave.

3. The gas laser device according to claim 1, wherein apertures each having an opening through which the laser light passes are located in front of said at least four mirrors.

4. The gas laser device according to claim 2, wherein the shape of protrusion of said shielding member has a protrusion of one mountain oriented to the discharge region formed by said first and second discharge region.

5. The gas laser device according to claim 3, wherein for said shielding member the following equation is satisfied, wherein a is a width of a surface oriented in a direction of protrusion height as measured along the optical axis, $\lambda$ is a wavelength of said laser light, $\phi$ is a diameter of said opening of said discharge aperture, D is a discharge gap between the discharge electrodes of said first and second pairs of discharge electrodes, and z is a distance from said shielding member to said opening

[Eq. 1]
$$a < \frac{4\lambda z}{\pi \phi \sin(D/z)}.$$

* * * * *